United States Patent [19]

Behl

[11] Patent Number: 4,474,863

[45] Date of Patent: Oct. 2, 1984

[54] HIGH ENERGY AMBIENT TEMPERATURE INORGANIC ELECTROCHEMICAL POWER CELL

[75] Inventor: Wishvender K. Behl, Ocean, N.J.

[73] Assignee: The United States of America as represented by the Secretary of the Army, Washington, D.C.

[21] Appl. No.: 467,624

[22] Filed: Feb. 18, 1983

[51] Int. Cl.³ .................. H01M 4/36; H01M 4/58
[52] U.S. Cl. ............................. 429/101; 429/105; 429/196; 429/218
[58] Field of Search ............. 429/101, 105, 196, 218; 420/415

[56] References Cited

U.S. PATENT DOCUMENTS 3,891,457  6/1975  Auborn ..................... 429/218 X

FOREIGN PATENT DOCUMENTS 407814  10/1909  France ........................ 429/415

OTHER PUBLICATIONS

*Calculations of Phase Diagrams and Thermochemistry of Alloy Phases*, TMS/ASME 1979, 8009–8072 0317, pp. 275–286, "Coulombic Titrations Using $CaF_2$ and $BaF_2$ in Solid Electrolytes to Study Alloy Phases" Delcet, Delgado and Egan.

Meitav et al., Calcium-$Ca(AlCl_4)_2$-$SoCl_2$ Cell: Performance and Safety, *Journal of the Electrochemical Society*, vol. 129, No. 3, p. 451, Mar. 1982.

Binder et al., Calcium-Sulfuryl Chloride Primary Cell, *Journal of the Electrochemical Society*, vol. 129, No. 4, p. 897, Apr. 1982.

*Primary Examiner*—Donald L. Walton
*Assistant Examiner*—Stephen J. Kalafut
*Attorney, Agent, or Firm*—Anthony T. Lane; Jeremiah G. Murray; Roy E. Gordon

[57] ABSTRACT

A high energy ambient temperature inorganic electrochemical power cell is provided comprising calcium metal alloyed with about 10 percent of either zinc or antimony as the anode, high surface area carbon black as the cathode and a solution of calcium tetrachloroaluminate or lithium tetrachloroaluminate in sulfuryl chloride or thionyl chloride as the electrolyte.

15 Claims, 1 Drawing Figure

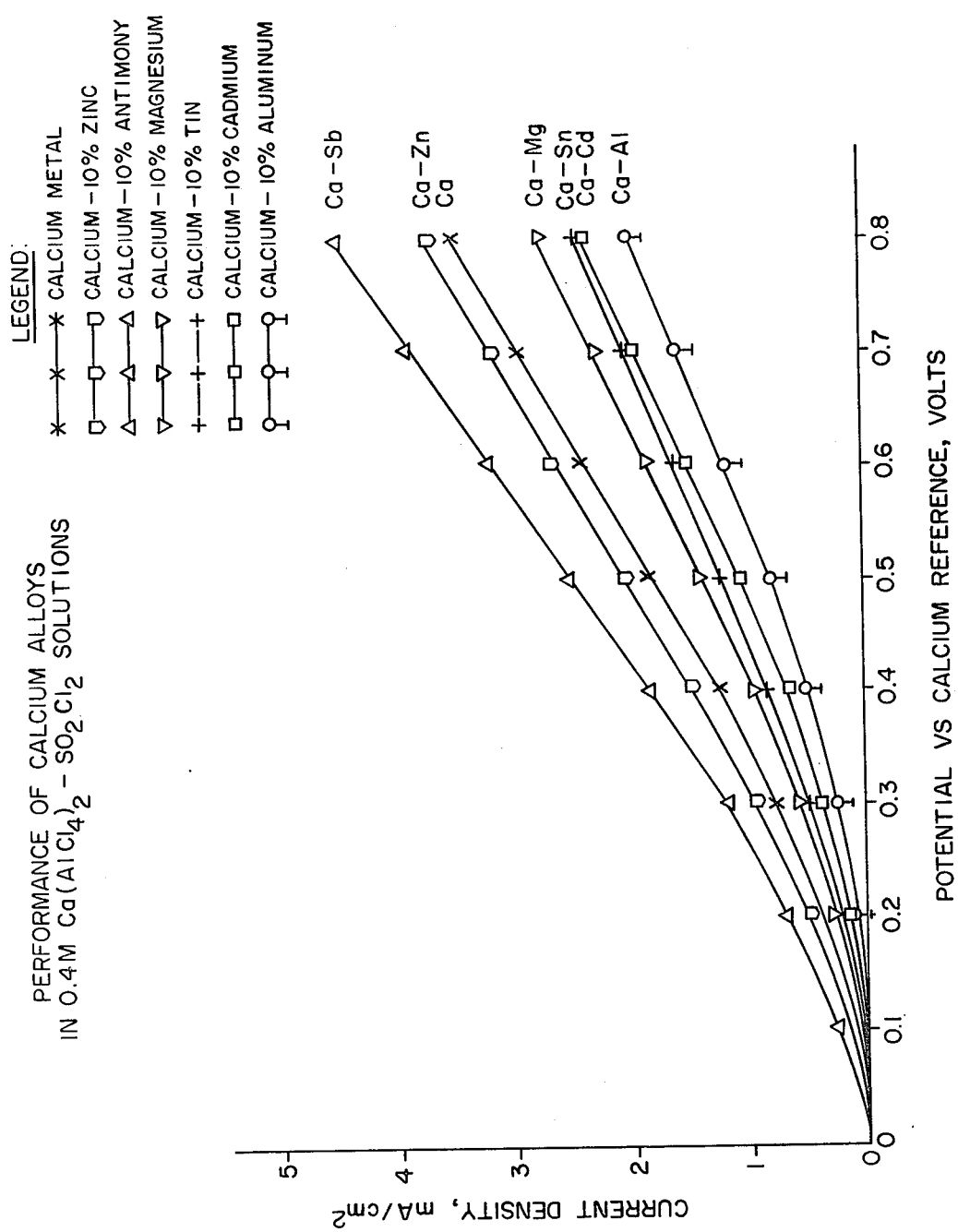

HIGH ENERGY AMBIENT TEMPERATURE INORGANIC ELECTROCHEMICAL POWER CELL

This invention relates in general to the use of calcium alloy anodes in high energy ambient temperature inorganic electrochemical power cells and in particular to the use of calcium metal alloyed with either 10 percent zinc or antimony as the anode in a high energy ambient temperature inorganic electrochemical power cell including high surface area carbon black as the cathode and a solution of calcium tetrachloroaluminate in sulfuryl chloride as the electrolyte.

BACKGROUND OF THE INVENTION

Ambient temperature inorganic electrolyte cells have generally employed lithium metal as the anode, high surface area carbon black as the cathode and a solution of lithium tetrachloroaluminate in thionyl chloride or sulfuryl chloride as the electrolyte. However, due to the low melting point of lithium metal (180.7 degrees C.), the lithium metal anode can melt under conditions when excessive heat is generated such as short circuit, forced overdischarge, etc. Molten lithium metal then can react with other components of the cell or discharge products such as elemental sulfur causing cell venting, cell rupture or under worst conditions cell explosions.

Attempts are, therefore, being made to find alternate anode materials for these cells. Thus, calcium metal which has a high melting point (839 degrees C.) has been successfully used as the anode material in calcium/thionyl chloride and calcium/sulfuryl chloride cells. The difficulty however, is that the open circuit voltage of calcium-sulfuryl chloride cells (3.2 volts) is much lower than the theoretically calculated value of 3.807 volts from the thermodynamic data. Thus, calcium/sulfuryl chloride cells operate much below their theoretical potential because of possible slow electrochemical kinetics of the calcium electrode.

SUMMARY OF THE INVENTION

The general object of this invention is to provide an improved high energy ambient temperature electrochemical power cell. A more particular object of the invention is to provide an improvement on the calcium anode used in calcium-sulfuryl chloride cells.

It has now been found that the foregoing objects can be obtained by alloying the calcium metal with about 10 percent zinc or antimony.

The use of the calcium-zinc alloy or the calcium-antimony alloy as anodes in calcium/sulfuryl chloride cells improves the electrochemical kinetics of the calcium electrodes resulting in lower polarization and improved rate capability of calcium-sulfuryl chloride cells.

The fact that the calcium-zinc and calcium-antimony alloy would work so well was unexpected and unpredictable. This was established when several alloys were tested as anode materials. These alloys included: Calcium—10% Magnesium, Calcium—10% Tin, Calcium—10% Cadmium, Calcium—10% Aluminum, Calcium—10% Zinc and Calcium—10% Antimony. Only the calcium—10% zinc and Calcium—10% Antimony showed better performance than the calcium metal.

DESCRIPTION OF THE DRAWING

The anodic polarization curves for the several alloys tested as anode materials are plotted in the drawing.

It is seen that except for calcium-zinc and calcium-antimony, all other alloys have poorer performance than the calcium metal anode. Both calcium-zinc and calcium-antimony show better performance than the calcium metal. The improvement achieved with calcium-10% antimony is especially significant.

The calcium-10% zinc alloy anode and the calcium-10% antimony alloy anode is prepared by art established technique generally involving the melting of 90 weight percent calcium and 10 weight percent zinc or antimony under inert atmosphere of argon gas or under vacuum and then resolidification of the homogeneous mixture under the inert atmosphere.

DESCRIPTION OF THE PREFERRED EMBODIMENT

In preparing a complete cell, a cathode is first prepared using art established techniques. More particularly, a cathode may be conveniently prepared by mixing one gram of a furnace black carbon powder having a surface area of about 1000 square meters per gram with an emulsion containing 0.12 grams of polytetrafluoroethylene and a sufficient amount of water to yield a stiff paste. The paste is then applied to a 2.5 cm×2 cm expanded nickel support screen. The support is prepared by welding 2 thicknesses of screen together, with the mesh out of registration so as to provide maximum tortuosity. While still moist, the electrode is compressed to an intermediate thickness of 0.0615 inch. After vacuum drying for 24 hours at 99 degrees C., the cathode is compressed in a 0.025 inch frame and after re-expansion has a final thickness of 0.035 inch. The cathode has a porosity of 87 percent.

A complete cell can be conveniently assembled in an all-Teflon jig with the plane of the electrodes parallel to the bottom of the jig. The cathode as prepared above is placed between two calcium-10% antimony alloy anodes. After assembling the cell and adding 3 cc of a 0.4 molar solution of calcium tetrachloroaluminate in sulfuryl chloride as the electrolyte, a Teflon weight is applied to the cell to help maintain good contact between the cell components.

In lieu of furnace black carbon powder as the high surface area carbon black one may use other high surface area carbon blacks.

In lieu of calcium tetrachloroaluminate as the electrolyte salt, one may use lithium tetrachloroaluminate or tetraalkyl salts.

In lieu of sulfuryl chloride as the electrolyte solvent, one may use thionyl chloride or modify the electrolyte by adding an inorganic solvent such as phosphorus oxychloride and such organic solvents as propylene carbonate, acetonitrile, etc. These solvents are added to modify the physiochemical properties of the electrolyte such as the conductivity, boiling point, freezing point, vapor pressure, etc.

I wish it to be understood that I do not desire to be limited to the exact details as described for obvious modifications will occur to a person skilled in the art.

What is claimed is:

1. A high energy ambient temperature inorganic electrochemical power cell comprising calcium metal alloyed with about 10 percent of an element selected from the group consisting of zinc and antimony as the anode, high surface area carbon black as the cathode and a solution of a salt selected from the group consisting of calcium tetrachloroaluminate and lithium tetrachloroaluminate in a solvent selected from the group consisting of sulfuryl chloride and thionyl chloride as the electrolyte.

2. A high energy ambient temperature inorganic electrochemical power cell according to claim 1 wherein the anode comprises calcium metal alloyed with about 10 percent of zinc.

3. A high energy ambient temperature inorganic electrochemical power cell according to claim 1 wherein the anode comprises calcium metal alloyed with about 10 percent of antimony.

4. A high energy ambient temperature inorganic electrochemical power cell according to claim 1 wherein the electrolyte is a solution of calcium tetrachloroaluminate in sulfuryl chloride.

5. A high energy ambient temperature inorganic electrochemical power cell according to claim 2 wherein the electrolyte is a solution of calcium tetrachloroaluminate in sulfuryl chloride.

6. A high energy ambient temperature inorganic electrochemical power cell according to claim 3 wherein the electrolyte is a solution of calcium tetrachloroaluminate in sulfuryl chloride.

7. A high energy ambient temperature inorganic electrochemical power cell according to claim 1 wherein the electrolyte is a solution of calcium tetrachloroaluminate in thionyl chloride.

8. A high energy ambient temperature inorganic electrochemical power cell according to claim 2 wherein the electrolyte is a solution of calcium tetrachloroaluminate in thionyl chloride.

9. A high energy ambient temperature inorganic electrochemical power cell according to claim 3 wherein the electrolyte is a solution of calcium tetrachloroaluminate in thionyl chloride.

10. A high energy ambient temperature inorganic electrochemical power cell according to claim 1 wherein the electrolyte is a solution of lithium tetrachloroaluminate in sulfuryl chloride.

11. A high energy ambient temperature inorganic electrochemical power cell according to claim 2 wherein the electrolyte is a solution of lithium tetrachloroaluminate is sulfuryl chloride.

12. A high energy ambient temperature inorganic electrochemical power cell according to claim 3 wherein the electrolyte is a solution of lithium tetrachloroaluminate in sulfuryl chloride.

13. A high energy ambient temperature inorganic electrochemical power cell according to claim 1 wherein the electrolyte is a solution of lithium tetrachloroaluminate in thionyl chloride.

14. A high energy ambient temperature inorganic electrochemical power cell according to claim 2 wherein the electrolyte is a solution of lithium tetrachloroaluminate in thionyl chloride.

15. A high energy ambient temperature inorganic electrochemical power cell according to claim 3 wherein the electrolyte is a solution of lithium tetrachloroaluminate in thionyl chloride.

* * * * *